Oct. 10, 1939.   H. P. PHILLIPS   2,175,409
PISTON RING
Filed April 23, 1936
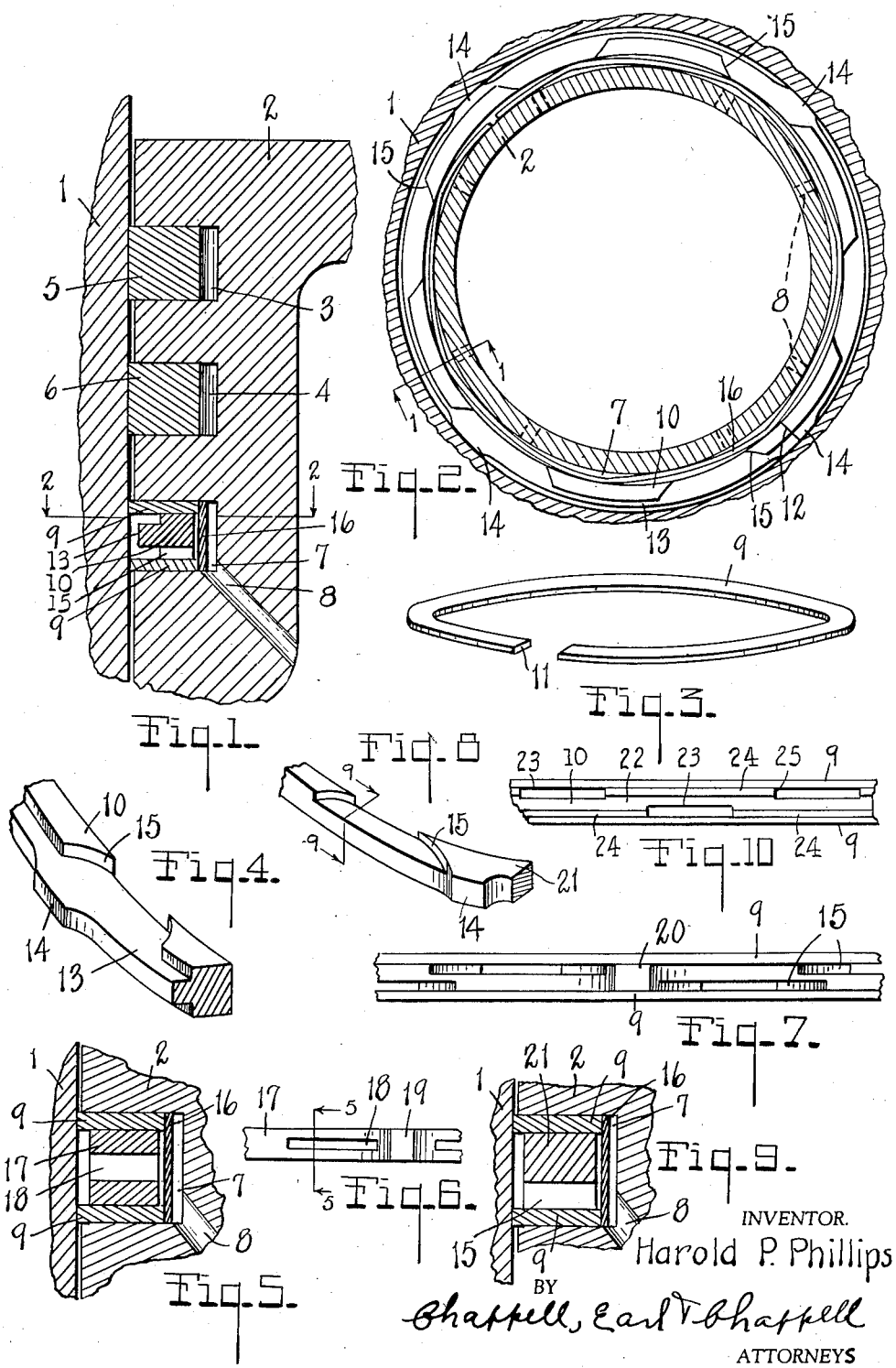
INVENTOR.
Harold P. Phillips
BY Chappell, Earl T. Chappell
ATTORNEYS Patented Oct. 10, 1939

2,175,409

UNITED STATES PATENT OFFICE 2,175,409

PISTON RING

Harold P. Phillips, Hastings, Mich., assignor to Hastings Manufacturing Company, Hastings, Mich.

Application April 23, 1936, Serial No. 75,993

2 Claims. (Cl. 309—45)

This invention relates to improvements in piston rings.

The main objects of this invention are:

First, to provide a novel piston ring or piston ring assembly which is highly efficient as an oil control ring and also for the effective sealing or preventing of "blow-by".

Second, to provide a composite ring or ring assembly having these advantages, which is very durable and is especially desirable for use in oversize or worn cylinders.

Objects relating to details and economies of my invention will appear from the description to follow. The invention is defined and pointed out in the claims.

Preferred embodiments of my invention are illustrated in the accompanying drawing, wherein:

Fig. 1 is an enlarged fragmentary longitudinal sectional view of an engine structure embodying my invention, the section being taken on line 1—1 of Fig. 2.

Fig. 2 is a fragmentary transverse sectional view on line 2—2 of Fig. 1.

Fig. 3 is a perspective view of one of the side or sealing elements of my ring assembly.

Fig. 4 is a fragmentary perspective view of the intermediate or spacer element of the assembly.

Fig. 5 is an enlarged fragmentary view in section on a line corresponding to line 5—5 of Fig. 6 and showing a modified form of my invention, the modification being in the spacer or intermediate element.

Fig. 6 is a fragmentary edge view of the spacer element shown in Fig. 5.

Fig. 7 is a fragmentary edge view of a further modification of my composite ring or ring assembly.

Fig. 8 is an enlarged fragmentary perspective view of still another form or modification of intermediate member.

Fig. 9 is a fragmentary sectional view illustrating the assembly with the modification of Fig. 8 embodied therein.

Fig. 10 is a fragmentary edge view of a further modification of my composite ring assembly.

Referring to the drawing, numeral 1 indicates a cylinder and 2 the piston. The piston is provided with piston ring grooves 3 and 4, the piston rings 5 and 6 shown therein being of the conventional compression type. The piston ring groove 7 is provided with drain openings 8 through which the lubricant collected by the oil ring assembly arranged therein drains back to the crankcase.

My improved composite ring or piston ring assembly comprises spaced side or scraper ring members 9 supported in spaced relation within the groove by the spacer or intermediate member 10. These members 9 are expansible rings having splits 11 therein permitting expansion, and they are urged outwardly into engagement with the cylinder wall by their own tension. These members are preferably formed of flat stock steel rolled edgewise to form the relatively thin members, and it is desired to point out in this connection that no attempt is made in the drawing to show the parts in their relative dimensions, the parts being substantially enlarged for convenience in illustration.

The member 10 is provided with slot-like side openings or recesses 15 which provide oil drainage openings for the space between the side members 9 to the bottom of the piston ring groove, the groove, as stated, being provided with drain openings 8 so that oil collected in the space or channel between the scraper ring members 9 is discharged through the openings 15 into the drain openings 8.

I have illustrated the assembly with an expanding spring 16 which is shown in Fig. 2 as being preferably sinuously bent and which acts to urge the ring members 9 and 10 outwardly. This is particularly useful where the assembly is used in worn or rebored or reground cylinders, but is not necessary for new installations as the desired unit or wall engaging pressure can be provided in the members 9. It is not necessary that the member 10 should be urged against the wall with any considerable force because its contact with the wall is merely a centering contact. In actual construction, the expansion of member 10 alone is relied on to maintain its centering contact with the cylinder wall, the expanding spring bearing only against steel rings 9, as illustrated in Fig. 1, to maintain them snugly against the cylinder wall.

The spring 16 is provided with edge or other openings, not illustrated, through which the lubricant may escape from the passages 15. Expanding springs having such openings are known in the art.

In the modification shown in Figs. 5 and 6, the spacer or intermediate member 17 is provided with central slots or lubricant ports or passages 18. It is also provided with centering lands or wall contacting portions 19 corresponding to the portions 14 of the embodiment described.

In the embodiment shown in Fig. 7, the intermediate or spacer member 20 is provided with recesses 15 on both sides.

In the embodiment shown in Figs. 8 and 9, the member 21 is very similar to member 10 of Fig. 4, except that the rib-like portion 13 is omitted, the member being, however, provided with the same type of side recesses 15 and cylinder contacting lands or segments 14.

Fig. 10 illustrates a still further embodiment of my invention, consisting of an inner spacer member 10 between two steel rings 9, the member 10 being of a diameter equal to the diameter of the steel rings 9 and grooved centrally at 22. The upper and lower sides of the ring 10 are milled to provide slots 23 spaced by cylinder contacting segments 24. It will be noted that the upper and lower slots are in staggered relation and that the slots extend past the cylinder contacting portions 24 and into the groove 22, as indicated by the reference numeral 25, thus providing oil passages amply sufficient to permit the flow of oil without obstruction.

As an alternate construction, I contemplate centering spacer ring 13 by means of its contact with inner expanding spring 16. In this construction, the contact lands 14 and 19 are eliminated. The spacer or intermediate member is contractile in nature, wherefore it will be centered interiorly against the expanding spring 16. Such an interiorly centering spacer may be formed of steel, cast iron, or other suitable material and serves to space steel rings 9 in a manner similar to that described with respect to the outwardly centering spacer of the foregoing modifications.

As stated, I have not attempted to show the parts in their relative proportions. It is desired to point out, however, that I have obtained very satisfactory results with my composite ring or ring assembly in which the side or scraper members 9 were .015 inch to .032 inch thick formed of flat steel stock coiled edgewise. The spacer member would, of course, be of suitable thickness to properly space and support the members 9 within the particular piston ring groove, and, as I have pointed out, this is shown much enlarged in Fig. 1.

My improved piston ring assemblies are highly efficient, both from the sealing or "blow-by" preventing standpoint and also from the standpoint of oil control.

I have illustrated and described my improvements in certain embodiments which I have found highly practical. I have not attempted to illustrate or describe other embodiments or adaptations as it is believed that this disclosure will enable those skilled in the art to which my invention relates to embody or adapt the same as may be desired.

Having thus described my invention, what I claim as new and desire to secure by Letters Patent is:

1. A piston ring assembly comprising spaced thin steel expansible side members disposed to present edge contact to a cylinder wall, an intermediate cast iron expansible spacer member disposed between said side members and freely slidable radially relative thereto, said spacer member having a peripheral rib provided with a plurality of spaced cylinder wall engaging arcuate centering portions, said intermediate member having side slots opening at the outer and inner sides thereof and providing lubricant passages between the said spacer and side members, and an expanding spring arranged within said side and intermediate members in supporting engagement with the side members and acting to urge them yieldingly outward.

2. A piston ring assembly comprising spaced thin steel expansible side members disposed to present edge contact to a cylinder wall, and an intermediate cast iron expansible spacer member disposed between said side members and freely slidable radially relative thereto, said spacer member having a central peripheral rib provided with a plurality of spaced cylinder wall engaging arcuate centering portions, said intermediate member having side slots opening at the outer and inner sides thereof and providing lubricant passages between the said spacer and side members.

HAROLD P. PHILLIPS.